United States Patent [19]

Yoneta et al.

[11] Patent Number: 5,574,345
[45] Date of Patent: Nov. 12, 1996

[54] POWER SUPPLY CIRCUIT FOR MAGNETIC BEARING SYSTEM

[75] Inventors: Tadao Yoneta; Takashi Unno; Yukihiro Kurita; Chikaya Shinba, all of Shizuoka, Japan

[73] Assignee: NTN Corporation, Osaka, Japan

[21] Appl. No.: 395,007

[22] Filed: Feb. 27, 1995

[30] Foreign Application Priority Data

Feb. 28, 1994 [JP] Japan .................................... 6-029694

[51] Int. Cl.⁶ ...................................................... H02P 3/12
[52] U.S. Cl. .............................. 318/376; 318/87; 310/74; 310/90.5
[58] Field of Search ...................... 310/113, 112, 310/114, 74, 90, 90.5; 363/108, 109, 175; 318/611, 661, 254, 653, 779, 376, 138, 758, 759, 375, 368, 362, 87

[56] References Cited

U.S. PATENT DOCUMENTS

| | | |
|---|---|---|
| 3,845,372 | 10/1974 | Ringland et al. ........................ 318/779 |
| 4,329,636 | 5/1982 | Uchida et al. ........................... 318/254 |
| 4,551,708 | 11/1985 | Welburn .................................. 318/661 |
| 5,208,522 | 5/1993 | Griepentrog et al. ................... 318/611 |
| 5,347,191 | 9/1994 | Wood ...................................... 310/113 |

*Primary Examiner*—John W. Cabeca
*Attorney, Agent, or Firm*—Lowe, Price, LeBlanc & Becker

[57] ABSTRACT

AC input voltage is lowered at a transformer, rectified at a rectifying circuit, then smoothed at a smoothing circuit, and thus produced DC voltage is supplied to an inverter which drives a motor. The rectified DC voltage is provided to a DC/DC converter to generate power supply for a magnetic bearing, and DC power supply for controlling the magnetic bearing is generated at a DC/DC converter. During the power failure regenerative electric power from motor is provided to DC/DC converter to produce power voltage for the magnetic bearing, and DC voltage for controlling the magnetic bearing is provided from DC/DC converter.

4 Claims, 3 Drawing Sheets

POWER SUPPLY CIRCUIT FOR MAGNETIC BEARING SYSTEM

BACKGROUND OF THE INVENTION

1. Field of the Invention

The present invention relates to power supply circuits for magnetic bearing devices. The invention relates more particularly to a power supply circuit for a magnetic bearing system capable of maintaining the function of the magnetic bearing with regenerative electric power generated by the rotation of a motor without using a backup battery during the power failure, in a magnetic bearing spindle for use in a turbo molecular pump for example.

2. Description of the Related Art

FIG. 1 includes a cross sectional view of a conventional magnetic bearing spindle together with a block diagram for a control portion thereof. In FIG. 1, provided in a housing 21 are an upper radial magnetic bearing 22, a lower radial magnetic bearing 23, and a thrust magnetic bearing 24 for supporting a spindle 31. A motor 25 is provided in housing 21 between upper radial magnetic bearing 22 and lower radial magnetic bearing 23 in order to rotate spindle 31. Radial position sensors 26 and 27 for detecting displacement of spindle 31 in the radial direction are provided in the vicinity of upper radial magnetic bearing 22 and lower radial magnetic bearing 23. A thrust position sensor 28 for detecting displacement of spindle 31 in the direction of thrust is provided in the lower part. In addition, bearings 29 and 30 are provided in housing 21 for supporting spindle 31 in case that spindle 31 is not magnetically supported by magnetic bearings due to any abnormality. Detection outputs from radial position sensors 26, 27 and thrust position sensor 28 are provided to a magnetic bearing control circuit 42, which controls upper radial magnetic bearing 22, lower radial magnetic bearing 23 and thrust magnetic bearing 24.

Magnetic bearing control circuit 42 is provided with DC voltage produced by rectifying and smoothing commercially available AC voltage, the DC voltage drives upper radial magnetic bearing 22, lower radial magnetic bearing 23 and thrust magnetic bearing 24, and spindle 31 is magnetically supported by the magnetic force of an electromagnet and rotates by the driving force of motor 25.

Once the commercially available power supply fails, however, the magnetic force of the electromagnet will be lost. Therefore, backup batteries have been used in order to maintain the magnetic force of the electromagnet during the power failure. Use of such backup batteries, however, necessitates the maintenance of regularly exchanging the batteries due to the deterioration (the end of useful life) of such batteries. For this reason, a power supply circuit capable of maintaining the magnetic force of the electromagnet with regenerative electric power generated by the inertial rotation of motor 25 during the power failure is recently used.

FIG. 2 is a block diagram showing a power supply circuit for conventional magnetic bearing systems. In FIG. 2, AC input voltage provided to a transformer 1 is lowered, and the lowered AC voltage is rectified at rectifying circuit 2 and smoothed at a smoothing circuit 3 to be DC voltage. The DC voltage is supplied to an inverter 4 included in motor driving circuit 41 shown in FIG. 1, and inverter 4 provides motor 25 with power.

The AC input voltage is also converted into DC voltage by an AC/DC regulator 7 for input to a switch circuit 8. The DC voltage smoothed at smoothing circuit 3 is also provided to a DC/DC converter 10. DC/DC converter 10 converts regenerative electric power generated by the rotation of motor 25 during the power failure into prescribed DC voltage. The DC voltage output from DC/DC converter 10 is provided to switch circuit 8. Switch circuit 8 selects the DC voltage from AC/DC regulator 7 during the normal operation and selects the DC voltage from DC/DC converter 10 at a detection of power failure by a power failure detection circuit 11. The selected DC voltage is supplied to the magnetic bearing through magnetic bearing control circuit 42 shown in FIG. 1 as power supply and is converted into DC voltage to be applied to magnetic bearing control circuit 42 by a DC/DC converter 9.

In the power supply circuit for magnetic bearing system shown in FIG. 2, during the normal operation, AC input voltage is lowered at transformer 1, rectified at rectifying circuit 2, and smoothed into DC voltage by smoothing circuit 3 for supply to inverter 4, which drives motor 25 to rotate. AC input voltage is converted into DC voltage by AC/DC regulator 7, supplied to the magnetic bearings through switch circuit 8 as power supply, and converted into DC voltage for magnetic bearing control circuit 42 by DC/DC converter 9.

When AC input voltage fails, power failure detection circuit 11 instantly detects the failure and switches switch circuit 8 to the output side of DC/DC converter 10. Inverter 4 stops operating with the DC voltage produced by rectifying the AC voltage no longer supplied, but motor 25 makes inertial rotation and functions as a generator, and regenerative electric power generated is provided to DC/DC converter 10 through inverter 4. DC voltage output from DC/DC converter 10 is supplied to the magnetic bearings as power supply through switch circuit 8, and DC voltage is provided to the magnetic bearing control circuit by DC/DC converter 9.

Since in the power supply circuit shown in FIG. 2, AC/DC regulator 7 can maintain DC voltage at a prescribed level during the failure of AC input voltage only for several 10 msec, within that period power failure detection circuit 11 must detect the failure and switch circuit 8 must be switched such that the input of DC/DC converter 9 is connected to the output side of DC/DC converter 10. The provision of power failure detection circuit 11 and switch circuit 8 makes the structure complexed.

SUMMARY OF THE INVENTION

It is therefore an object of the invention to provide a power supply circuit for a magnetic bearing system capable of using regenerative electric power generated by the rotation of a motor as a control power supply during the power failure without providing a power failure detection circuit and a switch circuit.

Briefly stated, the present invention resides in a power supply circuit for supplying power to a magnetic bearing system which supports a spindle by means of magnetic bearings and rotates the spindle by the driving force of a motor, in which AC voltage is lowered by a transformer, rectified at a rectifying circuit and smoothed, and DC voltage output from the rectifying circuit is supplied to an inverter and power from the inverter is supplied to the motor during the normal operation. When AC voltage fails, the inverter outputs as DC voltage regenerative electric power generated by the rotation of the motor, and the DC voltage is converted by a DC conversion circuit into DC voltage for driving the magnetic bearings.

Therefore, according to the present invention, regenerative electric power obtained from a motor can be supplied as DC voltage for a magnetic bearing control circuit without providing a power failure detection circuit or a switch circuit as conventionally practiced.

In a more preferred embodiment, DC voltage output from a DC voltage conversion circuit is supplied to a control circuit for controlling a magnetic bearing.

An even more preferred embodiment includes an AC/DC regulator circuit for converting AC voltage into DC voltage higher than the DC voltage output from the DC voltage conversion circuit, and a counterflow protection diode which outputs the DC voltage output from the DC conversion circuit and the DC voltage output from the AC/DC regulator circuit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
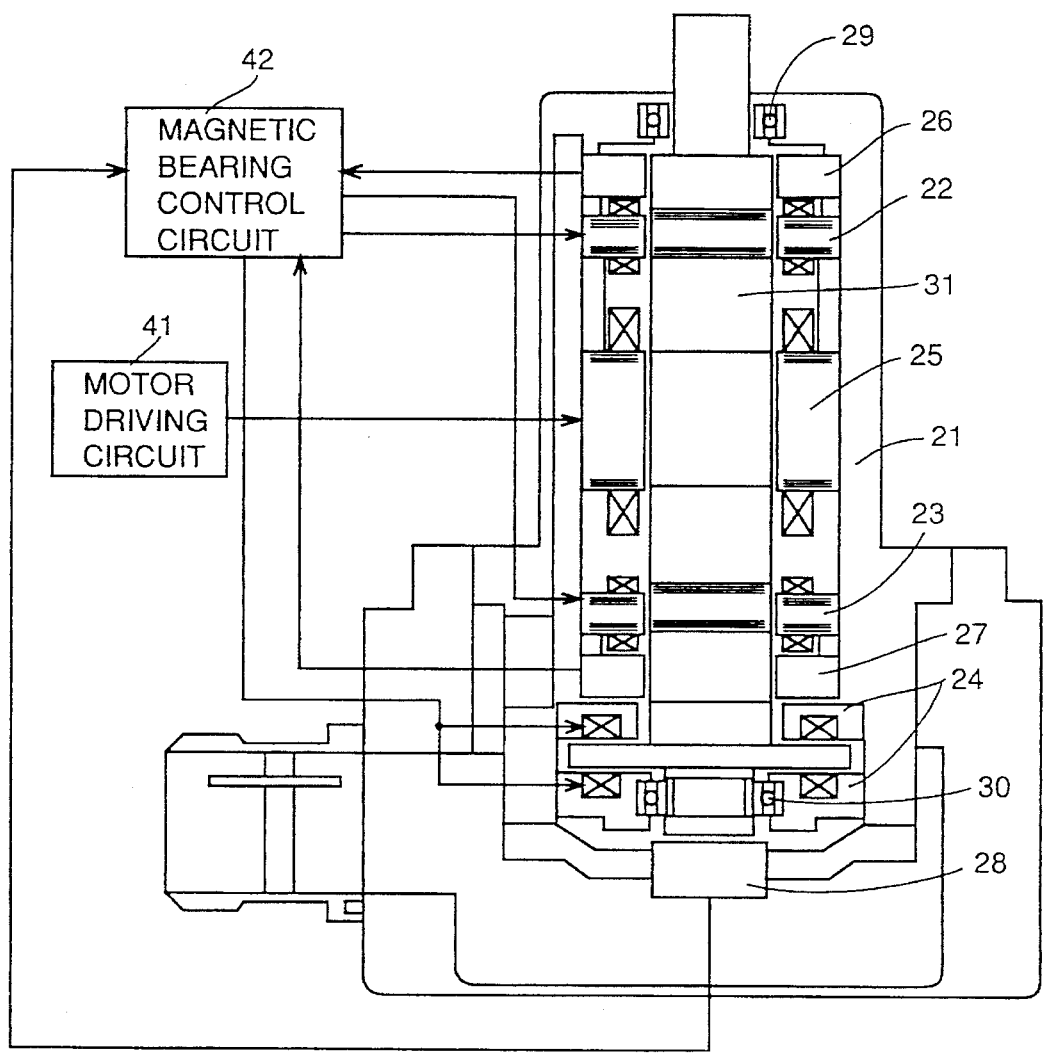
FIG. 1 includes a cross sectional view showing a conventional magnetic bearing spindle together with a block diagram for a control portion thereof.
Figure 2:
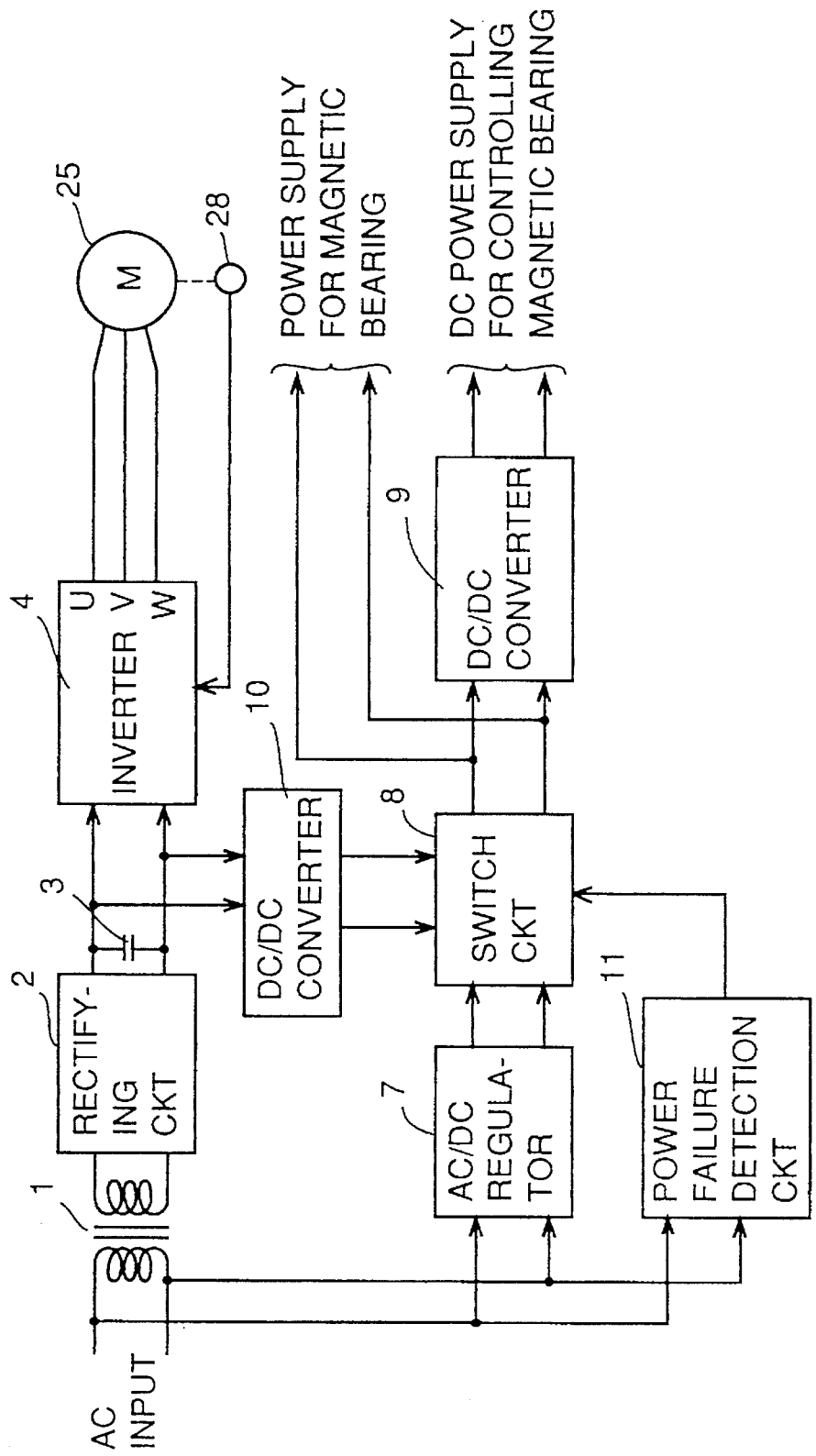
FIG. 2 is a block diagram schematically showing a power supply circuit for a conventional magnetic bearing system.
Figure 3:
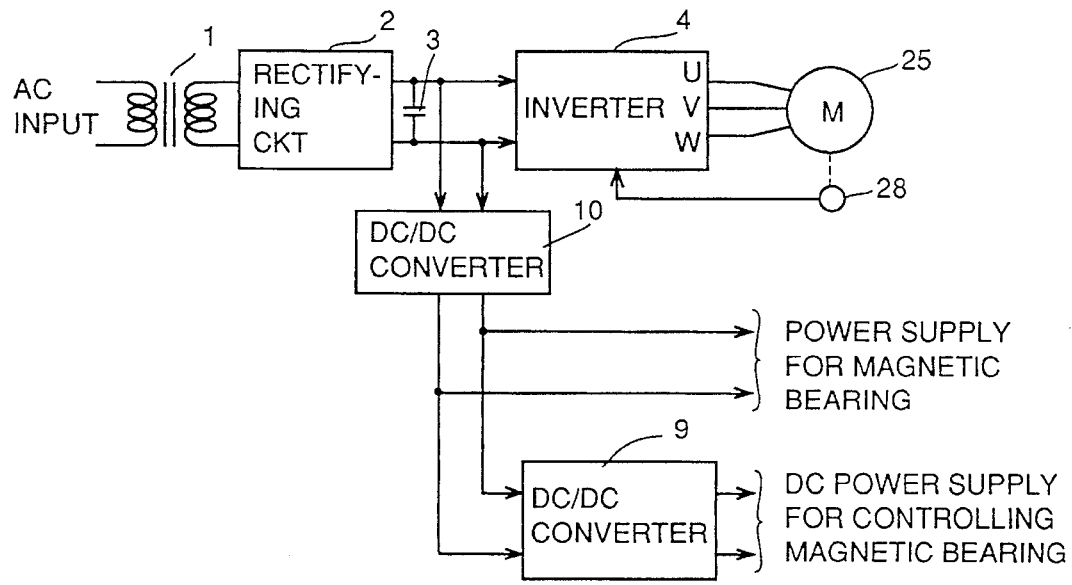
FIG. 3 is a block diagram showing a power supply circuit according to one embodiment of the invention.

FIG. 3 is a block diagram showing a power supply circuit according to one embodiment of the invention. In the embodiment shown in FIG. 3, AC/DC regulator 7, switch circuit 8, and power failure detection circuit 11 shown in FIG. 2 are not provided, and the output of DC/DC converter 10 is directly provided to the input of a magnetic bearing control circuit including DC/DC converter 9. Therefore, in this embodiment, during the normal operation, AC input voltage is lowered at transformer 1, then rectified at rectifying circuit 2, and smoothed at smoothing circuit 3 to produce DC voltage which is supplied to inverter 4 and DC/DC converter 10 at a time, and motor 25 is driven by the output of inverter 4. DC voltage from DC/DC converter 10 is supplied to magnetic bearings as power supply through magnetic bearing control circuit 42, and the DC voltage is converted by DC/DC converter 9 into DC voltage to be applied to magnetic bearing control circuit 42 for output.

During the a power failure, since AC input voltage is cut off, inverter 4 stops operating with no rectified DC voltage being applied. Motor 25 however makes inertial rotation, thus functioning as a generator, and therefore the rotating energy is supplied to inverter 4 as AC electric power, and inverter 4 rectifies the AC voltage for application to DC/DC converter 10. The DC voltage from DC/DC converter 10 is supplied to the magnetic bearings as power voltage and also to DC/DC converter 9, and converted into DC voltage for magnetic bearing control circuit 42, thus maintaining the operation of the magnetic bearing systems.

Although the embodiment shown in FIG. 3 requires increased load for driving the magnetic bearing as compared to those shown in FIG. 2 as the set of transformer 1 and rectifying circuit 2 and hence requires a larger capacity, AC/DC regulator 7, switch circuit 8 and power failure detection circuit 11 are not necessary, and therefore the structure may advantageously be simplified.

Figure 4:
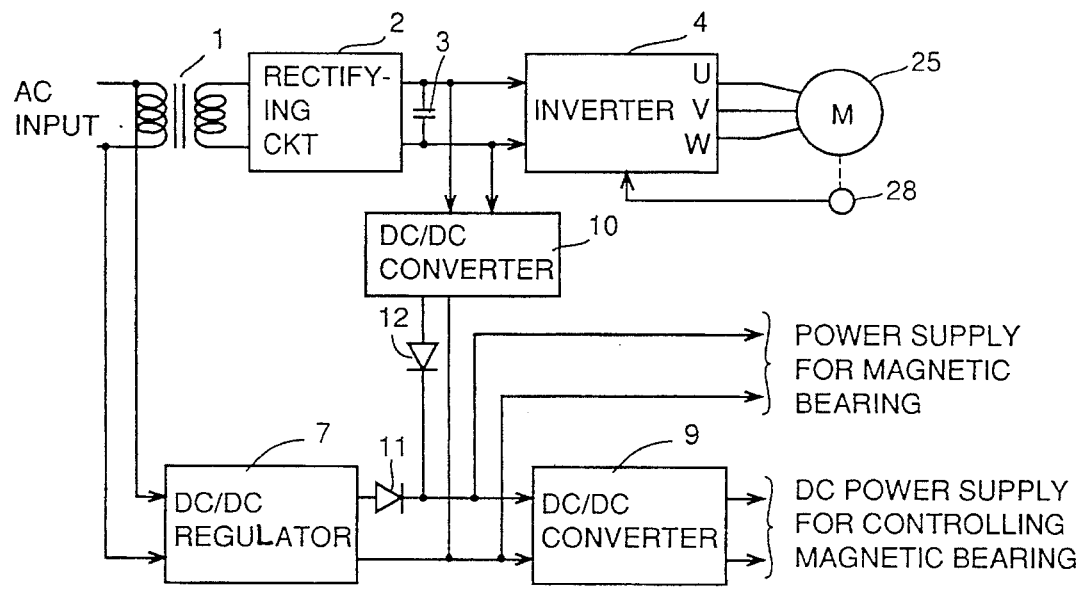
FIG. 4 is a block diagram showing a power supply circuit according to another embodiment of the invention.

FIG. 4 is a block diagram showing a power supply circuit according to another embodiment of the invention. In the embodiment shown in FIG. 4, the DC voltage output from AC/DC regulator 7 in the conventional example shown in FIG. 2 and the DC voltage output from DC/DC converter 10 are applied as power to the magnetic bearings through counterflow protection diodes 11 and 12, respectively, and DC/DC converter 9 is provided with DC voltage. The DC voltage output from AC/DC regulator 7 is however set higher than the DC voltage output from DC/DC converter 10.

In this embodiment, an AC input lowered at transformer 1 is rectified by rectifying circuit 2, and smoothed by smoothing circuit 3 into DC voltage which is supplied to inverter 4 and also to DC/DC converter 10. The AC input voltage is also converted into DC voltage by AC/DC regulator, and output through counterflow protection diode 11. Since the DC voltage output from AC/DC regulator 7 is selected to be higher than the DC voltage output from DC/DC converter 10, the DC voltage to the power supply for the magnetic bearing and to DC/DC converter 9 is supplied from AC/DC regulator 7.

Inverter 4 stops operating with no rectified DC voltage being supplied during the power failure, but motor 25 continues its inertial rotation, functions as a generator, and supplies regenerative electric power to inverter 4. Meanwhile, AC/DC regulator 7 stops functioning at the power failure. For the output of AC/DC regulator 7, the DC voltage maintains a prescribed level for a short period of time after the power failure and then begins to decrease gradually. At the time, DC/DC converter 10 outputs DC voltage by regenerative electric power generated by the rotation of motor 25, supply of power to the magnetic bearings is switched to the DC voltage output from DC/DC converter 10 at the point at which the DC voltage output from AC/DC regulator 7 becomes lower than the DC voltage output from DC/DC converter 10, and the magnetic bearing system is thus backed up by the regenerative electric power.

As described above, according to the embodiments of the invention, the magnetic bearings are driven by providing rectified DC voltage to DC/DC converter 10 during the normal operation, while regenerative electric power from motor 25 is applied to DC/DC converter to drive the magnetic bearings during the failure or AC voltage is converted into DC voltage by AC/DC regulator 7 during the normal operation and regenerative electric power from motor 25 is applied to DC/DC converter 10 to drive the magnetic bearings during the power failure, thus permitting back up during the power failure without providing a power failure detection circuit and a switch circuit as has been conventionally practiced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power supply circuit for supplying electric power to a magnetic bearing system which supports a spindle by magnetic bearings and rotates said spindle by the driving force of a motor, comprising:

a transformer for transforming a commercially available AC voltage;

a rectifying and filtering circuit connected to said transformer for rectifying and filtering said AC voltage into a smoothed DC voltage;

an inverter connected between said rectifying and filtering circuit and said motor, for converting said smoothed DC voltage into an AC voltage for the motor during normal operation, and for rectifying regenerative electric power generated by said motor when said commercially available AC voltage fails, a first DC/DC voltage converter having an input connected to said rectifying and filtering circuit and to said inverter and an output connected to said magnetic bearing, for converting the DC voltage output from said rectifying and filtering circuit during normal operation, and for converting the regenerated DC voltage output from said inverter when said AC voltage fails.

2. The power supply circuit according to claim 1, further comprising:

a magnetic bearing control circuit; and a second DC/DC converter connected between the output of said first DC/DC converter and said magnetic bearing control circuit, for converting the DC output voltage from said first DC/DC converter into a DC voltage for said control circuit.

3. The power supply circuit according to claim 1, further comprising:

an AC/DC regulator coupled to said commercially available AC voltage, for converting said AC voltage into a DC voltage voltage higher than the DC voltage output from said first DC/DC converter, a node for receiving said DC voltages output from said AC/DC regulator and said first DC/DC converter, said node being coupled to said magnetic bearing;

a first counterflow protection diode connected between the output of said first DC/DC converter and said node; and a second counterflow protection diode connected between an output of said AC/DC regulator and said node;

wherein said AC/DC regulator supplies power to said magnetic bearing during normal operation, and said first DC/DC converter supplies power to said magnetic bearing when said DC voltage output from said AC/DC converter becomes lower than the DC voltage output from said first DC/DC converter.

4. The power supply of claim 3, further comprising:

a magnetic bearing control circuit; and a second DC/DC converter connected between said node and said magnetic bearing control circuit, for converting the DC voltage applied to said node into a DC voltage for said control circuit.

\* \* \* \* \*